(12) United States Patent
McCall et al.

(10) Patent No.: US 8,329,969 B2
(45) Date of Patent: Dec. 11, 2012

(54) FUEL AND FUEL BLENDING COMPONENTS FROM BIOMASS DERIVED PYROLYSIS OIL

(75) Inventors: Michael J. McCall, Geneva, IL (US); Timothy A. Brandvold, Arlington Heights, IL (US); Douglas C. Elliott, Richland, WA (US)

(73) Assignee: UOP LLC, Des Plaines, IL (US)

( * ) Notice: Subject to any disclaimer, the term of this patent is extended or adjusted under 35 U.S.C. 154(b) by 719 days.

(21) Appl. No.: 12/419,005

(22) Filed: Apr. 6, 2009

(65) Prior Publication Data
US 2009/0253948 A1 Oct. 8, 2009

Related U.S. Application Data

(60) Provisional application No. 61/042,741, filed on Apr. 6, 2008.

(51) Int. Cl.
*C10G 45/00* (2006.01)
(52) U.S. Cl. ........ 585/240; 585/241; 585/242; 585/310; 585/319; 585/446; 585/454; 585/469
(58) Field of Classification Search .................... 208/49, 208/67; 585/240, 310, 319, 446, 454, 469
See application file for complete search history.

(56) References Cited

U.S. PATENT DOCUMENTS

| | | | |
|---|---|---|---|
| 4,115,246 A * | 9/1978 | Sweany ........................... 208/56 |
| 4,795,841 A | 1/1989 | Elliott et al. |
| 4,997,548 A * | 3/1991 | Rantell et al. ................. 208/408 |
| 5,180,868 A | 1/1993 | Baker et al. |
| 5,186,722 A | 2/1993 | Cantrell et al. |
| 5,705,722 A | 1/1998 | Monnier et al. |
| 5,959,167 A | 9/1999 | Shabtai et al. |
| 7,232,935 B2 | 6/2007 | Jakkula et al. |
| 7,279,018 B2 | 10/2007 | Jakkula et al. |
| 7,425,657 B1 | 9/2008 | Elliott et al. |
| 7,459,597 B2 | 12/2008 | Koivusalmi et al. |
| 7,491,858 B2 | 2/2009 | Murzin et al. |
| 7,501,546 B2 | 3/2009 | Koivusalmi et al. |
| 7,540,952 B2 | 6/2009 | Pinho et al. |
| 2004/0181313 A1* | 9/2004 | Mohedas et al. .............. 700/268 |
| 2005/0032920 A1* | 2/2005 | Norbeck et al. .............. 518/704 |
| 2006/0186020 A1 | 8/2006 | Gomes |
| 2006/0207166 A1 | 9/2006 | Herskowitz et al. |
| 2007/0006523 A1 | 1/2007 | Myllyoja et al. |
| 2007/0010682 A1 | 1/2007 | Myllyoja et al. |

(Continued)

FOREIGN PATENT DOCUMENTS
CN 11270300 A 9/2008
(Continued)

OTHER PUBLICATIONS

Speight, J.G. (1999). The Chemistry and Technology of Petroleum, 3rd ed., Marcel-Dekker, 918 pgs.*

(Continued)

*Primary Examiner* — Brian McCaig
(74) *Attorney, Agent, or Firm* — Maryann Maas

(57) ABSTRACT

A process for the conversion of biomass derived pyrolysis oil to liquid fuel components is presented. The process includes the production of diesel, aviation, and naphtha boiling point range fuels or fuel blending components by two-stage deoxygenation of the pyrolysis oil and separation of the products.

16 Claims, 4 Drawing Sheets

U.S. PATENT DOCUMENTS

| | | | |
|---|---|---|---|
| 2007/0068848 A1 | 3/2007 | Monnier et al. |
| 2007/0131579 A1 | 6/2007 | Koivusalmi et al. |
| 2007/0135316 A1 | 6/2007 | Koivusalmi et al. |
| 2007/0135663 A1 | 6/2007 | Aalto et al. |
| 2007/0135669 A1 | 6/2007 | Koivusalmi et al. |
| 2007/0161832 A1 | 7/2007 | Myllyoja et al. |
| 2007/0170091 A1 | 7/2007 | Monnier et al. |
| 2007/0175795 A1 | 8/2007 | Yao et al. |
| 2007/0260102 A1 | 11/2007 | Duarte Santiago et al. |
| 2007/0281875 A1 | 12/2007 | Scheibel et al. |
| 2007/0287873 A1 | 12/2007 | Coupard et al. |
| 2007/0299291 A1 | 12/2007 | Koivusalmi |
| 2008/0025903 A1 | 1/2008 | Cortright |
| 2008/0033188 A1 | 2/2008 | Dumesic et al. |
| 2008/0045731 A1 | 2/2008 | Zhang |
| 2008/0050792 A1 | 2/2008 | Zmierczak et al. |
| 2008/0052983 A1 | 3/2008 | Aulich et al. |
| 2008/0053870 A1 | 3/2008 | Marker et al. |
| 2008/0066374 A1 | 3/2008 | Herskowitz |
| 2008/0076945 A1 | 3/2008 | Marker et al. |
| 2008/0092436 A1 | 4/2008 | Seames et al. |
| 2008/0132435 A1 | 6/2008 | Ferreira Fontes et al. |
| 2008/0156694 A1 | 7/2008 | Chapus et al. |
| 2008/0161614 A1 | 7/2008 | Bertoncini et al. |
| 2008/0161615 A1 | 7/2008 | Chapus et al. |
| 2008/0163543 A1 | 7/2008 | Abhari et al. |
| 2008/0173570 A1 | 7/2008 | Marchand et al. |
| 2008/0216391 A1 | 9/2008 | Cortright et al. |
| 2008/0229654 A1 | 9/2008 | Bradin |
| 2008/0244962 A1 | 10/2008 | Abhari et al. |
| 2008/0281134 A1 | 11/2008 | Ghonasgi et al. |
| 2008/0300434 A1 | 12/2008 | Cortright et al. |
| 2008/0300435 A1 | 12/2008 | Cortright et al. |
| 2008/0302001 A1 | 12/2008 | Koivusalmi et al. |
| 2008/0308457 A1 | 12/2008 | Dindi et al. |
| 2008/0308458 A1 | 12/2008 | Dindi et al. |
| 2008/0312480 A1 | 12/2008 | Dindi et al. |
| 2008/0313955 A1 | 12/2008 | Silva et al. |
| 2009/0014354 A1 | 1/2009 | Knuuttila et al. |
| 2009/0019763 A1 | 1/2009 | Ghonasgi et al. |
| 2009/0029427 A1 | 1/2009 | Miller |
| 2009/0031617 A1 | 2/2009 | O'Rear |
| 2009/0062578 A1 | 3/2009 | Koivusalmi et al. |
| 2009/0069610 A1 | 3/2009 | Roberts, IV et al. |
| 2009/0071872 A1 | 3/2009 | Ginosar et al. |
| 2009/0077866 A1 | 3/2009 | Kalnes et al. |
| 2009/0082606 A1 | 3/2009 | Marker et al. |
| 2009/0084026 A1 | 4/2009 | Miller |
| 2009/0088351 A1 | 4/2009 | Miller |
| 2009/0107033 A1 | 4/2009 | Gudde et al. |
| 2009/0124839 A1 | 5/2009 | Dumesic et al. |
| 2009/0126260 A1 | 5/2009 | Aravanis et al. |
| 2009/0250376 A1 | 10/2009 | Brandvold et al. |
| 2009/0253947 A1 | 10/2009 | Brandvold et al. |
| 2009/0294324 A1 | 12/2009 | Brandvold et al. |
| 2009/0301930 A1 | 12/2009 | Brandvold et al. |

FOREIGN PATENT DOCUMENTS

| | | |
|---|---|---|
| CN | 11343552 A | 1/2009 |
| EP | 1719811 A1 | 8/2006 |
| EP | 2046917 | 1/2008 |
| WO | 2007063874 A1 | 6/2007 |
| WO | 2007064015 A1 | 6/2007 |
| WO | 2007064019 A1 | 6/2007 |
| WO | WO 2007/064019 A1 | 6/2007 |
| WO | WO 2007063874 A1 | 6/2007 |
| WO | WO 2007064015 A1 | 6/2007 |
| WO | 2007125332 A1 | 11/2007 |
| WO | WO 2007/125332 A1 | 11/2007 |
| WO | 2007141293 A1 | 12/2007 |
| WO | WO 2007/141293 A1 | 12/2007 |
| WO | 2008012415 A2 | 1/2008 |
| WO | WO 2008/012415 A2 | 1/2008 |
| WO | 2008020048 A2 | 2/2008 |
| WO | WO 2008/020048 A2 | 2/2008 |
| WO | 2008053284 A1 | 5/2008 |
| WO | WO 2008/053284 A1 | 5/2008 |
| WO | 2008101945 A1 | 8/2008 |
| WO | WO 2008/101945 A1 | 8/2008 |
| WO | 2008105518 A1 | 9/2008 |
| WO | 2008119895 A2 | 9/2008 |
| WO | WO 2008/105518 A1 | 9/2008 |
| WO | WO 2008/119895 A2 | 9/2008 |
| WO | 2008141830 A1 | 11/2008 |
| WO | 2008141831 A1 | 11/2008 |
| WO | WO 2008/141830 A1 | 11/2008 |
| WO | WO 2008/141831 A1 | 11/2008 |
| WO | 2008151792 A1 | 12/2008 |
| WO | 2008152199 A1 | 12/2008 |
| WO | WO 2008/151792 A1 | 12/2008 |
| WO | WO 2008/152199 A1 | 12/2008 |
| WO | 2009004181 A2 | 1/2009 |
| WO | 2009011639 A2 | 1/2009 |
| WO | 2009013233 A2 | 1/2009 |
| WO | WO 2009/004181 A2 | 1/2009 |
| WO | WO 2009/011639 A2 | 1/2009 |
| WO | WO 2009/013233 A2 | 1/2009 |
| WO | 2009020055 A1 | 2/2009 |
| WO | 2009025542 A1 | 2/2009 |
| WO | WO 2009/020055 A1 | 2/2009 |
| WO | WO 2009/025542 A1 | 2/2009 |
| WO | 2009059819 A1 | 5/2009 |
| WO | 2009059920 A2 | 5/2009 |
| WO | WO 2009/059819 A1 | 5/2009 |
| WO | WO 2009/059920 A2 | 5/2009 |

OTHER PUBLICATIONS

Baker, et al. "Catalytic Upgrading of Biomass Pyrolysis Oils" Pacific Northwest Laboratory, Richland, Washington, USA, pp. 883-895.

Elliott, et al. "Hydrotreating Biomass Liquids to Produce . . . ", presented in Washington, D.C., Apr. 7-10, 1986, published by IGT, Chicago: 1987. Chapter 42, pp. 765-784.

Baker, et al. "Technoeconomic Assessment of Direct Biomass Liquefaction to Transportation Fuels", Biomass 22 (1990) pp. 251-269.

Elliott, et al. "Developments in Thermochemical Biomass Conversion." vol. 1, pp. 611-621, Blackie Academic & Professional, London: 1996.

Office Action dated Jun. 21, 2011 for U.S. Appl. No. 12/418,986, Brandvold et al.

Applicant's Sep. 21, 2011 response to the Jun. 21, 2011 Office Action for U.S. Appl. No. 12/418,986, Brandvold et al.

Office Action dated Dec. 12, 2011 for U.S. Appl. No. 12/418,986, Brandvold et al.

Applicant's Mar. 12, 2012 response to the Dec. 12, 2011 Office Action for U.S. Appl. No. 12/418,986, Brandvold et al.

Office Action dated Jun. 16, 2011 for U.S. Appl. No. 12/418,994, Brandvold et al.

Applicant's Sep. 16, 2011 response to the Jun. 16, 2011 Office Action for U.S. Appl. No. 12/418,994, Brandvold et al.

Office Action dated Nov. 29, 2011 for U.S. Appl. No. 12/418,994, Brandvold et al.

Applicant's Feb. 29, 2012 response to the Nov. 29, 2011 Office Action for U.S. Appl. No. 12/418,994, Brandvold et al.

Office Action dated Jun. 16, 2011 for U.S. Appl. No. 12/418,971, Brandvold et al.

Applicant's Sep. 16, 2011 response to the Jun. 16, 2011 Office Action for U.S. Appl. No. 12/418,971, Brandvold et al.

Office Action dated Dec. 1, 2011 for U.S. Appl. No. 12/418,971, Brandvold et al.

Applicant's Feb. 29, 2011 response to the Dec. 1, 2011 Office Action for U.S. Appl. No. 12/418,971, Brandvold et al.

Office Action dated Jun. 16, 2011 for U.S. Appl. No. 12/418,963, Brandvold et al.

Applicant's Sep. 16, 2011 response to the Jun. 16, 2011 Office Action for U.S. Appl. No. 12/418,963, Brandvold et al.

Office Action dated Nov. 30, 2011 for U.S. Appl. No. 12/418,963, Brandvold et al.

Applicant's Feb. 29, 2012 response to the Nov. 30, 2011 Office Action for U.S. Appl. No. 12/418,963, Brandvold et al.

Office Action dated May 17, 2012 for U.S. Appl. No. 12/418,994, Brandvold et al.
Applicant's Sep. 17, 2012 response to the May 17, 2012 Office Action for U.S. Appl. No. 12/418,994, Brandvold et al.
Office Action dated May 22, 2012 for U.S. Appl. No. 12/418,971, Brandvold et al.
Applicant's Sep. 17, 2012 response to the May 22, 2012 Office Action for U.S. Appl. No. 12/418,971, Brandvold et al.
Office Action dated May 21, 2012 for U.S. Appl. No. 12/418,963, Brandvold et al.
Applicant's Sep. 17, 2012 response to the May 21, 2012 Office Action for U.S. Appl. No. 12/418,963, Brandvold et al.
Office Action dated Mar. 27, 2012 for U.S. Appl. No. 12/418,986, Brandvold et al.

* cited by examiner

US 8,329,969 B2

FUEL AND FUEL BLENDING COMPONENTS FROM BIOMASS DERIVED PYROLYSIS OIL

CROSS-REFERENCE TO RELATED APPLICATION

This application claims priority from Provisional Application Ser. No. 61/042,741 filed Apr. 6, 2008, the contents of which are hereby incorporated by reference in its entirety.

STATEMENT OF GOVERNMENT INTEREST

This invention was made under CRADA PNNL/259 between UOP LLC and Alliance for Sustainable Energy, LLC, as operator of the National Renewable Energy Laboratory on behalf of the United States Department of Energy, and Battelle Memorial Institute, as operator of the Pacific Northwest National Laboratory on behalf of the United States Department of Energy. The Government has certain rights in this invention.

BACKGROUND OF THE INVENTION

This invention relates to processes for obtaining hydrocarbons from biomass. More particularly, this invention relates to the treatment of pyrolysis oil produced from the pyrolysis of biomass to produce fuel or fuel blending or additive components. The fuel or fuel additives or blending components may include those in the gasoline boiling point range, the diesel boiling point range, and the aviation boiling point range.

Renewable energy sources are of increasing importance. They are a means of reducing dependence on petroleum oil and provide a substitute for fossil fuels. Also, renewable resources can provide for basic chemical constituents to be used in other industries, such as chemical monomers for the making of plastics. Biomass is a renewable resource that can provide some of the needs for sources of chemicals and fuels.

Biomass includes, but is not limited to, lignin, plant parts, fruits, vegetables, plant processing waste, wood chips, chaff, grain, grasses, corn, corn husks, weeds, aquatic plants, hay, paper, paper products, recycled paper and paper products, and any cellulose containing biological material or material of biological origin. Lignocellulosic biomass, or cellulosic biomass as used throughout the remainder of this document, consists of the three principle biopolymers cellulose, hemicellulose, and lignin. The ratio of these three components varies depending on the biomass source. Cellulosic biomass might also contain lipids, ash, and protein in varying amounts. The economics for converting biomass to fuels or chemicals depend on the ability to produce large amounts of biomass on marginal land, or in a water environment where there are few or no other significantly competing economic uses of that land or water environment. The economics can also depend on the disposal of biomass that would normally be placed in a landfill.

The growing, harvesting and processing of biomass in a water environment provides a space where there is plenty of sunlight and nutrients while not detracting from more productive alternate uses. Biomass is also generated in many everyday processes as a waste product, such as waste material from crops. In addition, biomass contributes to the removal of carbon dioxide from the atmosphere as the biomass grows. The use of biomass can be one process for recycling atmospheric carbon while producing fuels and chemical precursors. Biomass when heated in an environment at short contact times with low or no oxygen, termed pyrolysis, will generate a liquid product known as pyrolysis oil. Synonyms for pyrolysis oil include bio-oil, pyrolysis liquids, bio-crude oil, wood liquids, wood oil, liquid smoke, wood distillates, pyroligneous acid, and liquid wood.

The product of the biomass pyrolysis, the pyrolysis oil, contains what is known as pyrolytic lignin. Pyrolytic lignin is the water insoluble portion of the pyrolysis oil. An advantage of the process is that the pyrolysis oil may be optionally processed without prior separation of the pyrolytic lignin to produce fuel blending components or fuels that work with engines or devices that are currently distributed around the world without requiring upgrades to those engines.

SUMMARY OF THE INVENTION

The invention provides a process for producing high yields of naphtha, aviation, and or diesel fuel, blending components, or related products from biomass. The biomass undergoes pyrolysis to generate pyrolysis oil. The whole pyrolysis oil may be processed or optionally at least a portion of the aqueous phase may be removed to provide a pyrolytic lignin enriched pyrolysis oil generated from biomass. The pyrolysis oil, or a pyrolytic lignin enriched pyrolysis oil, is treated in a partial deoxygenation zone generating a partially deoxygenated stream. Water, gasses, and light ends are removed and the remainder of the partially deoxygenated stream is further treated in a full deoxygenation zone to produce a deoxygenated product stream. The deoxygenated product stream comprises hydrocarbon compounds that when fractionated are useful as gasoline and naphtha, aviation fuel, or as additives to, or blending components of, one or both products. The product stream can also be upgraded to produce a diesel fuel, blending component, or additive. Furthermore, the product stream can serve as a source of chemicals or chemical feedstocks.

After the full deoxygenation zone, water light ends, and gasses may be removed from the effluent of the full deoxygenation zone. Hydrogen may be separated and recycled. In one embodiment the first and full deoxygenation zones are combined and housed within in a single reactor.

DETAILED DESCRIPTION OF THE INVENTION

Figure 1:
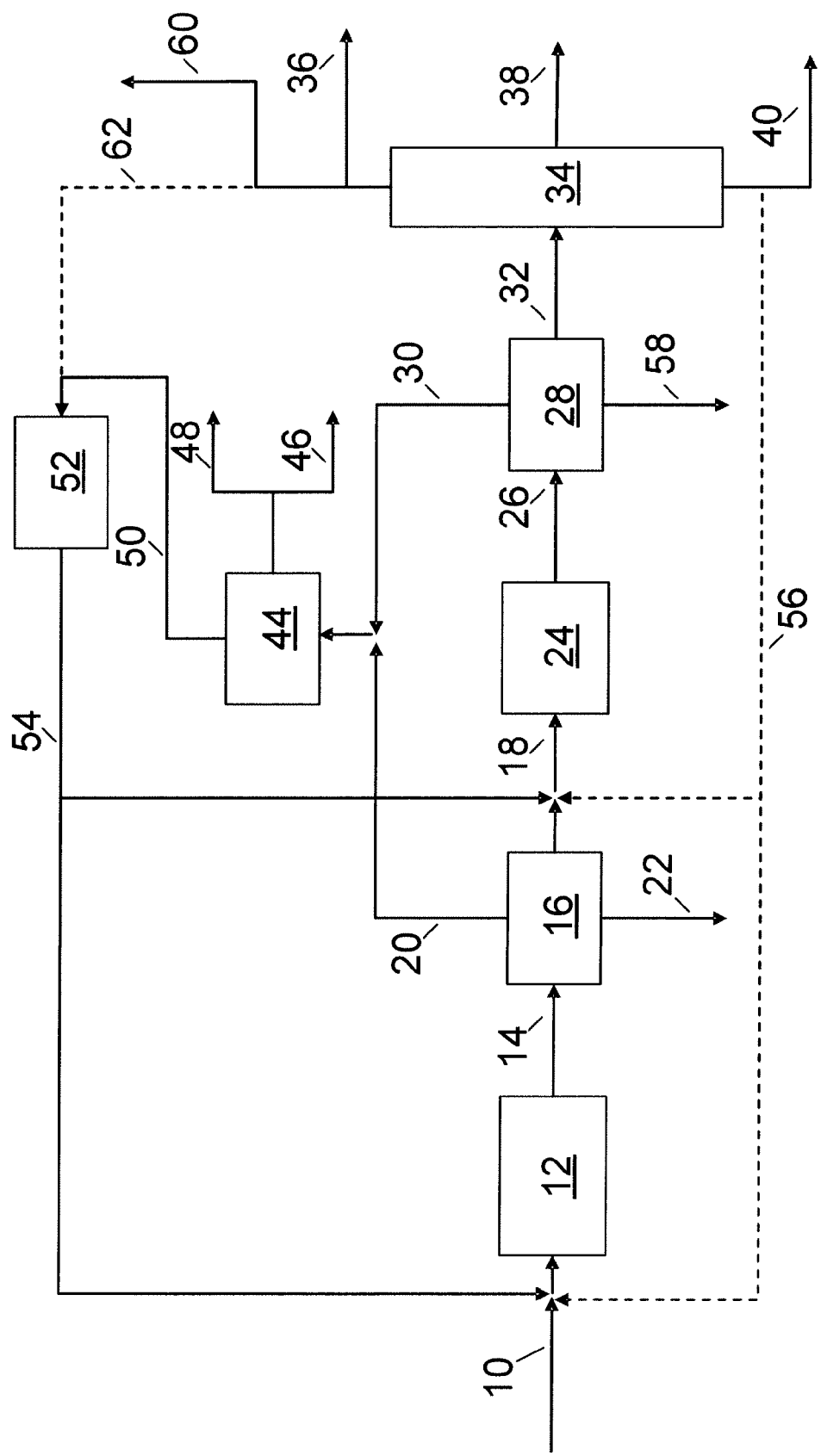
FIG. 1 shows a process flow scheme for one embodiment of the invention where the whole pyrolysis oil is processed.

In the U.S. and worldwide, there are huge amounts of lignocellulosic material, or biomass, which is not utilized, but is left to decay, often in a landfill, or just in an open field or forest. The material includes large amounts of wood waste products, and leaves and stalks of crops or other plant material that is regularly discarded and left to decay in fields. The emergence of inedible lipid-bearing crops for the production of renewable diesel will also produce increased amounts of biomass post extraction, often known as meal. Growth of cellulosic ethanol will also produce large amounts of a lignin side product. Biomass includes, but is not limited to, lignin, plant parts, fruits, vegetables, plant processing waste, wood chips, chaff, grain, grasses, corn, corn husks, weeds, aquatic plants, hay, meal, paper, paper products, recycled paper and paper products, and any cellulose containing biological material or material of biological origin. This biomass material can be pyrolyzed to make a pyrolysis oil, but due to poor thermal stability, the high water content of the pyrolysis oil, often greater than 25%, high total acid number often greater than 100, low heating value, and phase incompatibility with petroleum based materials, pyrolysis oil has not found wide use as a fuel.

This process substantially converts the pyrolysis oil from biomass into naphtha, aviation, and diesel boiling range components, having low acidity, low water, low oxygen, and low sulfur content. The pyrolysis of the biomass to form the pyrolysis oil is achieved by any technique known in the art, see for example, Mohan, D.; Pittman, C. U.; Steele, P. H. Energy and Fuels, 2006, 20, 848-889. Once the pyrolysis oil is generated from the biomass, although optional, it is not necessary to separate the pyrolytic lignin from the pyrolysis oil before further processing, thereby eliminating a step previously employed in industry. The whole pyrolysis oil may be processed, without a portion of the aqueous phase being removed to enrich the pyrolysis oil in the pyrolytic lignin. The pyrolytic ligin contains potentially high value products in the form of aromatic and naphthenic compounds having complex structures that comprises aromatic rings that are linked by oxygen atoms or carbon atoms. These structures can be broken into smaller segments when decarboxylated, decarbonylated, or hydrodeoxygenated, while maintaining the aromatic ring structures. One desired product is at least one cyclic hydrocarbon-rich stream. However, this processing of the pyrolytic ligin may be accomplished in the presence of the rest of the pyrolysis oil and no separation of the pyrolytic ligin before processing is required. Pyrolytic lignin is a pyrolysis product of the lignin portion of biomass. It can be separated from the rest of the whole pyrolysis oil during the pyrolysis process or through post-processing to produce an additional aqueous phase, which includes pyrolysis products primarily from the cellulose and hemicellulose portion of the biomass. The pyrolysis process can convert all components in the biomass feedstock into products useful as fuels or fuel components after full deoxygenation of the pyrolysis oil product. The water soluble components can also be transformed to naphthenes and aromatics under pyrolysis conditions. The production of heavier molecular weight products is known from steam cracking technology to produce light olefins, also run under pyrolysis conditions. Even feeds such as ethane, propane, and light naphtha produce heavier side products in these thermal cracking processes. The amount of these heavier products depends on the conditions of the thermal cracking reactor. Optionally, the pyrolysis oil may be separated and only a portion of the pyrolysis oil be introduced to the partial deoxygenation zone.

In one embodiment the pyrolysis oil is fully deoxygenated in two separate zones, a partial deoxygenation zone and a full deoxygenation zone. The partial deoxygenation zone may also be considered to be a hydrotreating zone and the full deoxygenation zone may be considered to be a hydrocracking zone. "Full" deoxygenation is meant to include deoxygenating at least 99% of available oxygenated hydrocarbons. The zones will primarily be referred to herein as a partial deoxygenation zone and a full deoxygenation zone. In the partial deoxygenation zone, partial deoxygenation occurs at milder conditions than the full deoxygenation zone and uses a catalyst such as a hydrotreating catalyst. In general, the partial oxidation zone removes the most reactive and thermally instable oxygenates. The oxygen level of the pyrolysis oil feedstock, which typically ranges from about 35 wt. % to about 60 wt %, is reduced to a significantly lower level, from about 5 wt. % to about 20 wt. % in the partial deoxygenation zone. Water is reduced from pyrolysis oil feedstock levels from about 10 wt. % to about 40 wt. % to levels from about 2 wt. % to about 11 wt. %. The acidity is greatly reduced as well in the partial deoxygenation zone, from a TAN level of about 125 to about 200 in the pyrolysis oil feedstock to a reduced level from about 40 to about 100 in the partial deoxygenation zone effluent.

The more thermally stable effluent from the partial deoxygenation zone can then be fully deoxygenated in the full deoxygenation zone. In the full deoxygenation zone, a hydrocracking catalyst, which has higher activity as compared to the hydrotreating catalyst, is employed with the option of more severe process conditions in order to catalyze the deoxygenation of less reactive oxygenates. Some hydrocracking of feedstock molecules will also occur to a higher extent than in the partial deoxygenation zone. In the full deoxygenation zone, oxygen content is reduced from about 5 wt. % to about 20 wt. % to much lower levels, from ppm concentrations to about 0.5 wt. %. Water is also greatly reduced in the full deoxygenation zone, from about 2 wt. % to about 11 wt. % down to levels from about 100 ppm to about 1000 ppm. The acidity is greatly reduced from initial TAN levels of about 40 to about 100 mg KOH/g oil to lower levels from about 0.5 to about 4 mg KOH/g oil. The effluent of the full deoxygenation zone is a hydrocarbon mixture rich in naphthenes and aromatics.

In one embodiment, as shown in FIG. 1, pyrolysis oil 10 is not separated and enters partial deoxygenation zone 12 along with recycle hydrogen stream 54 and optional hydrocarbon recycle 56 where contact with a deoxygenation and hydrogenation catalyst at deoxygenation conditions generates partially deoxygenated pyrolysis oil stream 14. The deoxygenation zone 12 performs catalytic decarboxylation, decarbonylation, and hydrodeoxygenation of oxygen polymers and single oxygenated molecules in the pyrolysis oil by breaking the oxygen linkages, and forming water and $CO_2$ from the oxygen and leaving smaller molecules. For example, the phenylpropyl ether linkages in the pyrolytic lignin will be partially deoxygenated producing some aromatic rings, such as alkylbenzenes and polyalkylbenzenes. Very reactive oxygenates will be deoxygenated as well, including small molecular weight carboxylic acids therefore greatly increasing the thermal stability of the product. Pyrolysis oil components not derived from lignin, including cellulose, hemicellulose, free sugars, may yield products such as acetic acid, furfural, furan, levoglucosan, 5-hydroxymethylfurfural, hydroxyacetaldhyde, formaldehyde, and others such as those described in Mohan, D.; Pittman, C. U.; Steele, P. H. Energy and Fuels, 2006, 20, 848-889. Therefore, pyrolysis oil components not derived from lignin will also be partially or fully deoxygenated with the carbohydrates giving primarily light hydrocarbon fractions and water. The light hydrocarbon fractions may contain hydrocarbons with six or fewer carbon atoms. The reactions of decarbonylation, decarboxylation and hydrodeoxygenation are collectively referred to as deoxygenation reactions. Hydrogenation of olefins also occur in this zone. The catalysts and conditions of partial deoxygenation zone 12 are selected so that the more reactive compounds are deoxygenated. The effluent of partial deoxygenation zone is a partially deoxygenated pyrolysis oil stream 14 that has increased thermal stability as compared to the feed pyrolysis oil.

Partially deoxygenated pyrolysis oil stream 14 is passed to a separation zone 16. Carbon oxides, possibly hydrogen sulfide, and C3 and lighter components are separated and removed in overhead line 20 and a partially deoxygenated product stream 18 is removed from separation zone 16. Separation zone 16 may comprise a separator. Depending upon whether the separator is operated in a hot or cold mode, the water may be removed as a vapor in line 20 (hot separator mode) or as a liquid in line 22 (cold separator mode). Overhead line 20 comprises a large quantity of hydrogen and at least the carbon dioxide from the decarboxylation reaction. The carbon dioxide can be removed from the hydrogen by means well known in the art such as reaction with a hot carbonate solution, pressure swing absorption, etc. Also, absorption with an amine in processes such as described in co-pending applications U.S. Application No. 60/973,792 and U.S. Application No. 60/973,816, hereby incorporated by reference, may be employed. If desired, essentially pure carbon dioxide can be recovered by regenerating the spent absorption media. Therefore overhead line 20 is passed through one or more scrubbers 44 such as amine scrubbers to remove carbon dioxide in line 46 and hydrogen sulfide in line 48. Depending upon the scrubber technology selected some portion of water may also be retained by the scrubber. The lighter hydrocarbons and gasses, possibly including a portion of water, are conducted via line 50 to steam reforming zone 52. In one embodiment the light hydrocarbon fractions may contain hydrocarbons with six or fewer carbon atoms. After purification, hydrogen generated in steam reforming zone 52 is conducted via line 54 to combine with feedstock 10 and partially deoxygenated product stream 18. The hydrogen may be recycled to combine with the feedstock as shown or may be introduced directly to the reaction zone where hydrogenation primarily occurs and/or to any subsequent reactor beds.

The partially deoxygenated product stream 18 along with recycle hydrogen stream 54 and optional hydrocarbon recycle 56, is passed to a second hydrodeoxygenation zone 24, where the remaining oxygen is removed. Full deoxygenation zone 24 performs catalytic decarboxylation, decarbonylation, and hydrodeoxygenation of the remaining oxygen compounds that are more stable than those reacted in the first stage. Therefore, a more active catalyst and more severe process conditions are employed in full deoxygenation zone 24 as compared to partial deoxygenation zone 12 in order to catalyze full deoxygenation.

Full deoxygenation zone effluent 26 is introduced to phase separator 28. Carbon oxides, possibly hydrogen sulfide and C3 and lighter components are separated and removed in line 30 and liquid hydrocarbons are removed in line 32. Depending upon whether the separator is operated in a hot or cold mode, the water may be removed as a vapor in line 30 (hot separator mode) or as a liquid in line 58 (cold separator mode). The overhead in line 30 comprises a large quantity of hydrogen and the carbon dioxide from the decarboxylation reaction. The carbon dioxide can be removed from the hydrogen by means well known in the art, reaction with a hot carbonate solution, pressure swing absorption, etc. Also, absorption with an amine in processes such as described in co-pending applications, U.S. Pat. Nos. 7,982,077 and 7,982,078 hereby incorporated by reference, may be employed. If desired, essentially pure carbon dioxide can be recovered by regenerating the spent absorption media. Therefore line 30 is passed through one or more scrubbers 44 such as amine scrubbers to remove carbon dioxide in line 46 and hydrogen sulfide in line 48. Depending upon the scrubber technology selected some portion of water may also be retained by the scrubber. The lighter hydrocarbons and gasses, possibly including a portion of water, are conducted via line 50 to steam reforming zone 52. A liquid stream containing hydrocarbons is removed from separator 28 in line 32 and conducted to product fractionation zone 34. Product fractionation zone 34 is operated so that product cut 36 contains the hydrocarbons in a boiling range most beneficial to meeting the gasoline specifications. Product cut 38 is collected for use as aviation fuel or as a blending component of aviation fuel. The lighter materials such as naphtha and LPG are removed in fractionation zone overhead stream 60. A portion of stream 60 may be optionally conducted in line 62 to the reforming zone 52. If desired, the naphtha and LPG may be further separated into an LPG stream and a naphtha stream (not shown).

Hydrocarbons that have a boiling point higher than acceptable for the specification of the aviation fuel are removed in bottoms stream 40. A portion of bottoms stream 40 may be recovered and used as fuel such as, for example, low sulfur heating oil fuel. It is likely that bottoms stream 40 may be acceptable for use as diesel or a diesel blending component. Alternatively, bottoms stream 40 could be upgraded to diesel in a separate process. A portion of bottoms stream 40 is optionally recycled to partial deoxygenation zone 12 and/or full deoxygenation reaction zone 24. A portion of a hydrocarbon stream may also be cooled down if necessary and used as cool quench liquid between beds of one of the deoxygenation zones, or between the first and the full deoxygenation zone to further control the heat of reaction and provide quench liquid for emergencies. The recycle stream may be introduced to the inlet of one or both of the reaction zones and/or to any subsequent beds or reactors. One benefit of the hydrocarbon recycle is to control the temperature rise across the individual beds. However, as discussed within, the amount of hydrocarbon recycle may be is determined based upon the desired hydrogen solubility in the reaction zone. Increasing the hydrogen solubility in the reaction mixture allows for successful operation at lower pressures, and thus reduced cost. Operating with high recycle and maintaining high levels of hydrogen in the liquid phase helps dissipate hot spots at the catalyst surface and reduces the formation of undesirable heavy components which lead to coking and catalyst deactivation. Fractionation zone 26 may contain more than one fractionation column and thus the locations of the different streams separated may vary from that shown in the figures.

Figure 2:
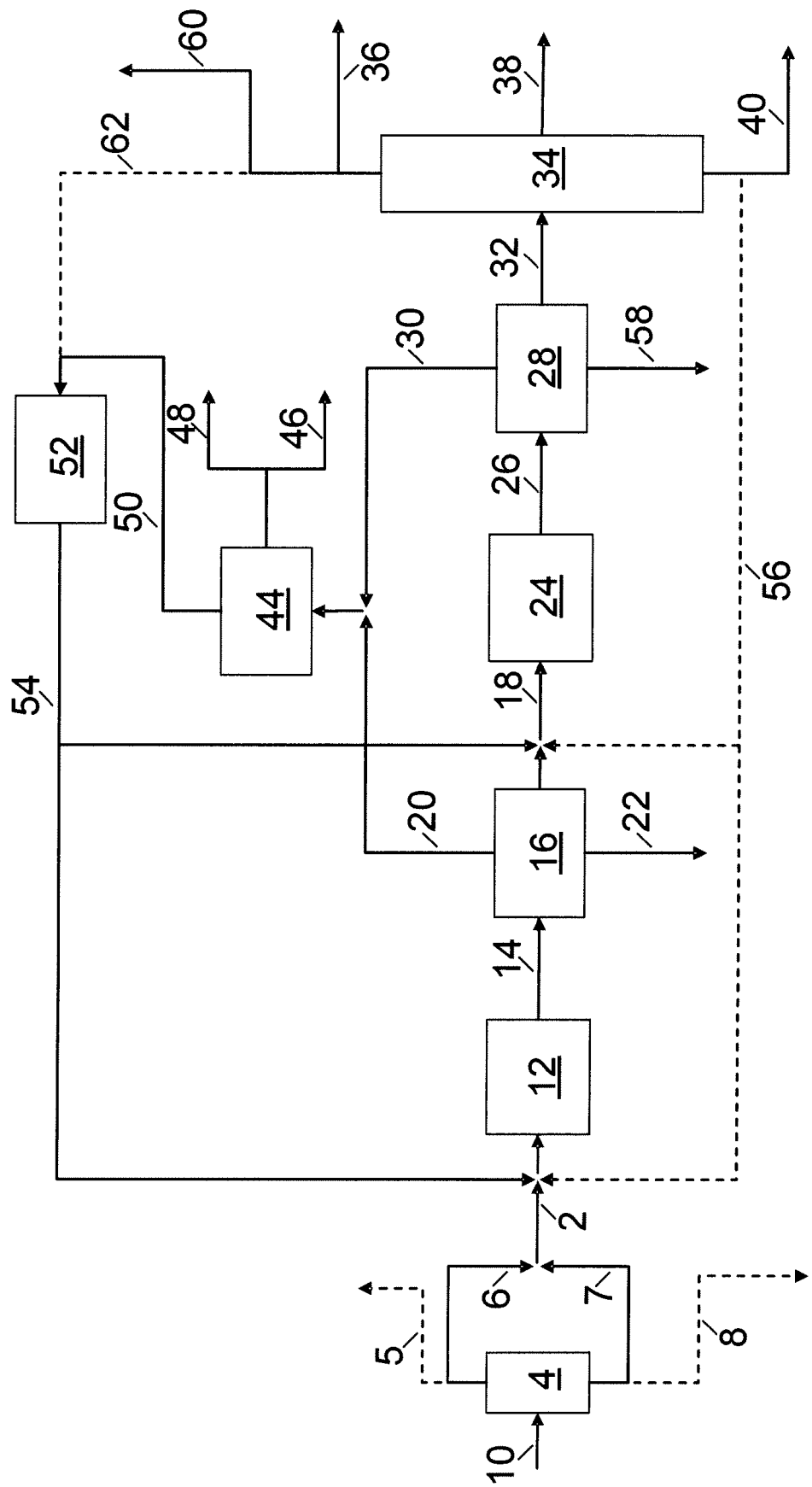
FIG. 2 shows a process flow scheme for one embodiment of the invention where at least a portion of the aqueous phase of the pyrolysis oil is separated from the pyrolysis oil, and at least the pyrolytic lignin is processed.

In another embodiment as shown in FIG. 2, a pyrolysis oil feed stream 10 is passed through phase separator 4 where it is separated into an aqueous phase and a pyrolytic lignin phase. A portion or all of pyrolytic lignin is removed from separator 4 in stream 7 which is then combined with stream 6 to form combined stream 2. Optionally, some or all of the pyrolytic lignin is removed via stream 8. Part of all of the aqueous phase is removed from separator 4 in stream 6 which is then combined with stream 7 to form combined stream 2. Optionally, aqueous phase pyrolysis oil can be removed through line 5. Combined stream 2, which is a pyrolytic lignin enriched pyrolysis oil, passes into partial deoxygenation zone 12 where partial deoxygenation occurs along with hydrogenation of reactive functional groups as described above. The partially deoxygenated product stream 14 passes through separator 16 where CO, CO2, H2O, and H2S are removed. Product stream 18 passes through full deoxygenation zone 24 where complete deoxygenation is catalyzed. Full deoxygenation zone product stream 26 passes through separator 28 where water, CO, CO2, and H2S are removed resulting in a liquid hydrocarbon stream 32. Liquid hydrocarbon stream 32 is passed through the fractionation zone 34 where it is separated into the desired fuel cuts as discussed above.

Figure 3:
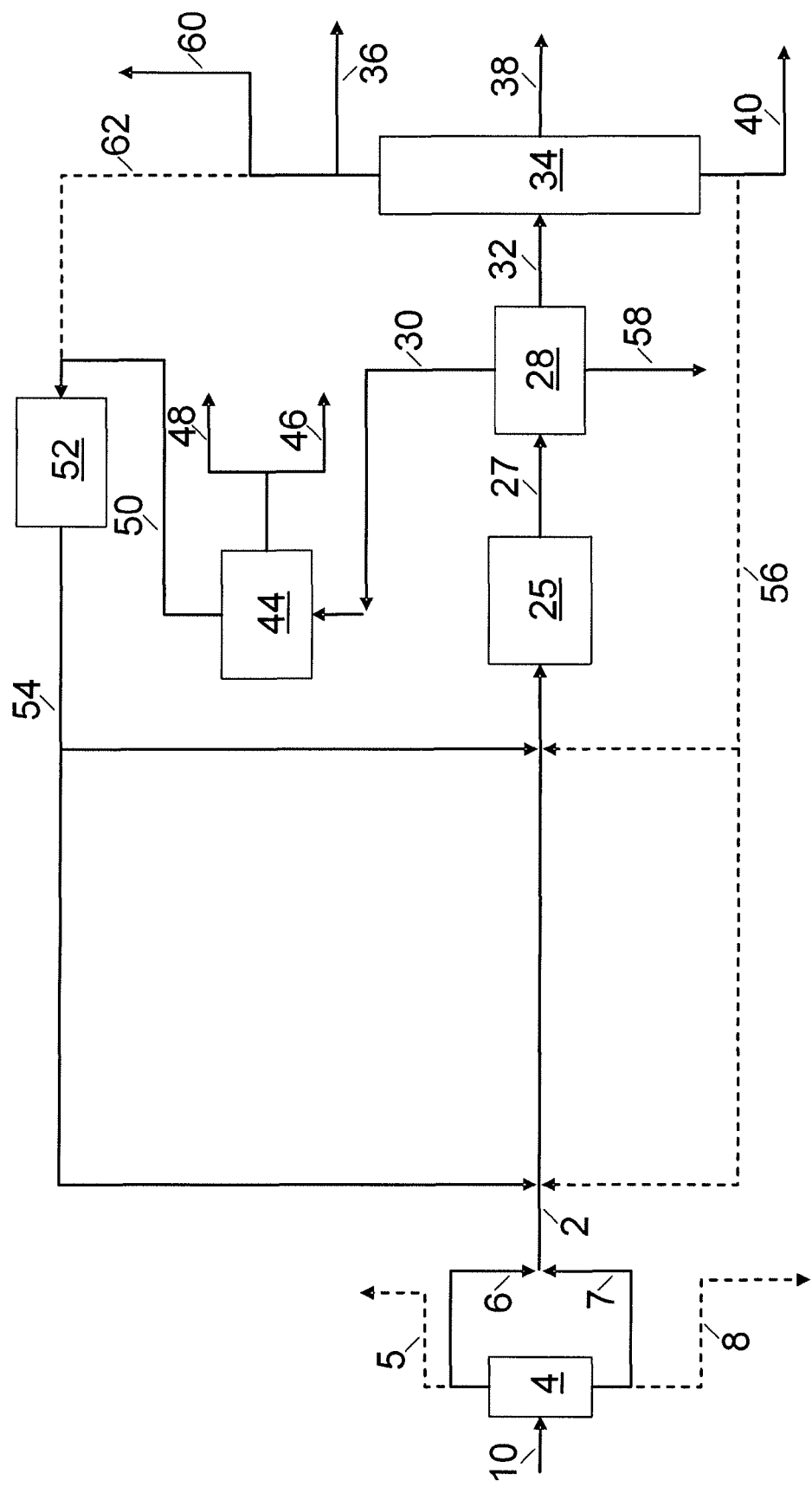
FIG. 3 shows a process flow scheme for one embodiment of the invention where the partial deoxygenation zone and the full deoxygenation zone are combined as sequential zones housed within in a single reactor.

In another embodiment as shown in FIG. 3 optionally a pyrolysis oil feed stream 10 is passed through phase separator 4 where it is separated into an aqueous phase and a pyrolytic lignin phase. A portion or all of pyrolytic lignin is removed from separator 4 in stream 7 which is then combined with stream 6 to form combined stream 2. Optionally, some or all of the pyrolytic lignin is removed via stream 8. Part of all of the aqueous phase is removed from separator 4 in stream 6 which is then combined with stream 7 to form combined stream 2. Optionally, aqueous phase pyrolysis oil can be removed through line 5. Either combined stream 2 (for the embodiment using pyrolytic lignin enriched pyrolysis oil), or pyrolysis oil feed stream 10 (for the embodiment using the whole pyrolysis oil) passes through deoxygenation zone 25 where contact with one or more catalysts fully deoxygenate the feed to produce a fully deoxygenated product stream 27. Deoxygenation zone 25 can employ a multifunctional catalyst capable of deoxygenation and hydrogenation or a set of catalysts. For example, partial deoxygenation and hydrogenation can occur over the first catalyst in a first portion of zone 12 while full deoxygenation occurs in a more active catalyst in a second portion of zone 25. A stacked bed configuration may be advantageous because a less active catalyst in an upper zone will deoxygenate the most reactive oxygen compounds without generating exotherms that can promote the formation of thermal coke. The fully deoxygenated product stream 27 is fed to phase separator 28 where water, CO, CO2, and H2S are removed resulting in a liquid hydrocarbon stream 32. Liquid hydrocarbon stream 32 is passed through the fractionation zone 34 where it is separated into the desired fuel cuts as discussed above.

Hydrogen is needed for the deoxygenation and hydrogenation reactions above, and to be effective, a sufficient quantity of hydrogen must be in solution in the deoxygenation zone to most effectively take part in the catalytic reaction. If hydrogen is not available at the reaction site of the catalyst, the coke forms on the catalyst and deactivates the catalyst. High operating pressures may be used in order to achieve a desired amount of hydrogen in solution and readily available for reaction and to avoid coking reactions on the catalyst. However, higher pressure operations are more costly to build and to operate as compared to their lower pressure counterparts.

The desired amount of hydrogen may be kept in solution at lower pressures by employing a large recycle of hydrocarbon. An added benefit is the control of the temperature in the deoxygenation zone(s) since the deoxygenation reactions are exothermic reactions. However, the range of recycle to feedstock ratios used herein is set based on the need to control the level of hydrogen in the liquid phase and therefore reduce the deactivation rate of the catalyst. The amount of recycle is determined not on temperature control requirements, but instead, based upon hydrogen solubility requirements. Hydrogen has a greater solubility in the hydrocarbon product than it does in the pyrolysis oil feedstock or the portion of the pyrolysis oil feedstock after separation. By utilizing a large hydrocarbon recycle the solubility of hydrogen in the liquid phase in the reaction zone is greatly increased and higher pressures are not needed to increase the amount of hydrogen in solution and avoid catalyst deactivation at low pressures. The hydrocarbon recycle may be a portion of the stream in any of lines 24, 34, 32, or 30, or any combination thereof, and the hydrocarbon recycle is directed to deoxygenation zone 12. The figure shows optional hydrocarbon recycle 34a as a portion of diesel boiling point range component 34. However it is understood that in other embodiments portions different streams or combinations of stream such as the product stream 24 or any of fractionation zone streams 28, 30, or 32 may be used as the hydrocarbon recycle. Suitable volume ratios of hydrocarbon recycle to pyrolysis oil feedstock is from about 2:1 to about 8:1. In another embodiment the ratio is in the range of about 3:1 to about 6:1 and in yet another embodiment the ratio is in the range of about 4:1 to about 5:1.

Furthermore, the rate of reaction in the deoxygenation zone is increased with the hydrocarbon recycle resulting in a greater amount of throughput of material through the reactor in a given period of time. Lower operating pressures provide an additional advantage in increasing the decarboxylation reaction while reducing the hydrodeoxygenation reaction. The result is a reduction in the amount of hydrogen required to remove oxygen from the feedstock component and produce a finished product. Hydrogen can be a costly component of the feed and reduction of the hydrogen requirements is beneficial from an economic standpoint.

In another embodiment, mixtures or co-feeds of the pyrolysis oil and other renewable feedstocks or petroleum derived hydrocarbons may also be used as the feedstock to the deoxygenation zone. The mixture of the pyrolysis oil and another renewable feedstock or a petroleum derived hydrocarbon is selected to result in greater hydrogen solubility. Other feedstock components which may be used as a co-feed component in combination with the pyrolysis oil from the above listed biomass materials, include spent motor oil and industrial lubricants, used paraffin waxes, liquids derived from gasification of coal, biomass, or natural gas followed by a downstream liquefaction step such as Fischer-Tropsch technology; liquids derived from depolymerization, thermal or chemical, of waste plastics such as polypropylene, high density polyethylene, and low density polyethylene; and other synthetic oils generated as byproducts from petrochemical and chemical processes. One advantage of using a co-feed component is the transformation of what has been considered to be a waste product from a petroleum based or other process into a valuable co-feed component to the current process.

The partial deoxygenation zone is operated at a pressure from about 3.4 MPa (500 psia) to about 14 MPa (3000 psia), and preferably is operated at a pressure from about 3.4 MPa (500 psia) to about 12 MPa (1800 psia). The partial deoxygenation zone is operated at a temperature from about 200° C. to 400° C. with one embodiment being from about 300° C. to about 375° C. The partial deoxygenation zone is operated at a space velocity from about 0.1 LHSV $h^{-1}$ to 1.5 LHSV $h^{-1}$ based on pyrolysis oil feedstock; this space velocity range does not include any contribution from a recycle stream. In one embodiment the space velocity is from about 0.25 to about 1.0 LHSV $h^{-1}$. The hydrogen to liquid hydrocarbon feed ratio is at about 5000 to 20000 scf/bbl with one embodiment being from about 10,000 to 15,000 scf/bbl. The catalyst in the partial deoxygenation zone is any hydrogenation and hydrotreating catalysts well known in the art such as nickel or nickel/molybdenum dispersed on a high surface area support. Other hydrogenation catalysts include one or more noble metal catalytic elements dispersed on a high surface area support. Non-limiting examples of noble metals include Pt and/or Pd dispersed on gamma-alumina or activated carbon. Another example includes the catalysts disclosed in U.S. Pat. No. 6,841,085, hereby incorporated by reference.

In the full deoxygenation zone, the conditions are more severe and the catalyst more active compared to that of the partial deoxygenation zone. The catalyst is any hydrocracking catalyst, having a hydrocracking function, that is well known in the art such as nickel or nickel/molybdenum dispersed on a high surface area support. Another example is a combined zeolitic and amorphous silica-alumina catalyst with a metal deposited on the catalyst. The catalyst includes at least one metal selected from nickel (Ni), chromium (Cr), molybdenum (Mo), tungsten (W), cobalt (Co), rhodium (Rh), iridium (Ir), ruthenium (Ru), and rhenium (Re). In one embodiment, the catalyst includes a mixture of the metals Ni and Mo on the catalyst. The catalyst is preferably a large pore catalyst that provides sufficient pore size for allowing larger molecules into the pores for cracking to smaller molecular constituents. The metal content deposited on the catalysts used are deposited in amounts ranging from 0.1 wt. % to 20 wt. %, with specific embodiments having values for the metals including, but not limited to, nickel in a range from 0.5 wt. % to 10 wt. %, tungsten in a range from 5 wt. % to 20 wt. %, and molybdenum in a range from 5 wt. % to 20 wt. %. The metals can also be deposited in combinations on the catalysts with example combinations being Ni with W, and Ni with Mo. Zeolites used for the catalysts include, but are not limited to, beta zeolite, Y-zeolite, MFI type zeolites, mordenite, silicalite, SM3, and faujasite. The catalysts are capable of catalyzing decarboxylation, decarbonylation and/or hydrodeoxygenation of the feedstock to remove oxygen as well as hydrogenation to saturate olefins. Cracking may also occur. Decarboxylation, decarbonylation, and hydrodeoxygenation are herein collectively referred to as deoxygenation reactions.

The full deoxygenation zone conditions include a relatively low pressure of about 6890 kPa (1000 psia) to about 13,790 kPa (2000 psia), a temperature of about 300° C. to about 500° C. and a liquid hourly space velocity of about 0.1 to about 3 $hr^{-1}$ based on fresh feed not recycle. In another embodiment the deoxygenation conditions include the same pressure of about 6890 kPa (1000 psia) to about 6895 kPa (1700 psia), a temperature of about 350° C. to about 450° C. and a liquid hourly space velocity of about 0.15 to about 0.40 $hr^{-1}$. It is envisioned and is within the scope of this invention that all the reactions are occurring simultaneously within a zone.

EXAMPLE

A whole mixed-wood pyrolysis oil feedstock was fed once-through a fixed bed reactor loaded with a hydrotreating catalyst at the conditions specified for partial deoxygenation zone (Zone 1) in Table 1 below. The effluent oil was isolated after separation of water generated in the reaction. The properties of the effluent oil from the partial deoxygenation zone are also shown in Table 1. The partially deoxygenated effluent oil from the partial deoxygenation zone was then fed to a full deoxygenation zone and contacted with a second catalyst at the elevated process conditions shown in Table 1. This second catalyst was a sulfided nickel and molybdenum on alumina catalyst. The overall volumetric yield of hydrocarbon that was isolated from the effluent of the full deoxygenation zone was about 51 vol % of the initial whole mixed-wood pyrolysis oil feedstock.

A whole pyrolysis oil feedstock produced from corn stover was fed once through a fixed bed reactor loaded with a hydrotreating catalyst at the conditions specified for the partial deoxygenation zone (Zone 1) in Table 2 below. The effluent oil was isolated after separation of water generated in the reaction. The properties of the effluent oil from the partial deoxygenation zone are also shown in Table 2. The partially deoxygenated effluent from the partial deoxygenation zone was then fed over a second catalyst in a full deoxygenation zone at the elevated process conditions shown. This second catalyst was a sulfided nickel molybdenum on alumina catalyst. The overall volumetric yield of hydrocarbon isolated from the effluent of the full deoxygenation zone was about 67 vol % of the initial whole pyrolysis oil feedstock produced from corn stover.

The third example again shows the complete deoxygenation of a whole pyrolysis oil produced from corn stover. The pyrolysis oil was fed once-through over a stacked fixed bed reactor. The upper zone of the reactor, the partial deoxygenation zone, was loaded with a milder hydrotreating catalyst run 250° C. as shown in table 3. The bottom zone of the reactor, the full deoxygenation zone, was loaded a sulfided nickel and molybdenum on alumina catalyst produced by UOP and kept at 400° C. The other process variables are shown in Table 3. This example shows that a single reactor with stacked catalyst beds is capable of full deoxygenation to produce a hydrocarbon product.

TABLE 1

| Zone | Pressure kPa g (psig) | Temp. (C.) | LHSV (h−1) | H2/oil (scf/bbl) | Oil yield (vol %) | Effluent Properties | | |
|---|---|---|---|---|---|---|---|---|
| | | | | | | O (wt %) | $H_2O$ | TAN (mg KOH/g oil) |
| 1: Partial Deoxygenation (Hydrotreating) | 13,858 (2010) | 315 | 0.25 | 18000 | 70% | 10.9% | 2.4 wt % | 51 |
| 2: Full Deoxygenation (Hydrocracking) | 10,411 (1510) | 405 | 0.25 | 14000 | 73% | 0.4% | 113 ppm | 2.6 |

TABLE 2

| Zone | Pressure kPa g (psig) | Temp. (C.) | LHSV (h−1) | H2/oil (scf/bbl) | Oil yield (vol %) | Effluent Properties | | |
|---|---|---|---|---|---|---|---|---|
| | | | | | | O (wt %) | $H_2O$ | TAN (mg KOH/g oil) |
| 1: Partial Deoxygenation (Hydrotreating) | 13,445 (1950) | 340 | 0.2 | 14000 | 79% | 12.8% | 3.2% | 47 |
| 2: Full Deoxygenation (Hydrocracking) | 10,514 (1525) | 407 | 0.19 | 13700 | 85% | 0.4% | 450 ppm | 1.6 |

TABLE 3

| Zone | Pressure kPa g (psig) | Temp. (C.) | LHSV (h−1) | H2/oil (scf/bbl) | Oil yield (vol %) | Effluent Properties | | TAN (mg KOH/g oil) |
|---|---|---|---|---|---|---|---|---|
| | | | | | | O (wt %) | H$_2$O | |
| 1. Upper Zone of Reactor (Partial Deoxygenation) | 13,445 (1950) | 250 | 0.14 | 10500 | 0.25 | 0.0035 | 300 ppm | 1.6 |
| 2: Bottom Zone of Reactor (Full Deoxygenation) | | 400 | | | | | | |

Table 4 shows the typical distribution of hydrocarbon classes produced after full deoxygenation of whole pyrolysis oil. The final distribution depends on the feedstock processed, catalyst choice, and process conditions. The distribution of the final product from example 2 above is shown in the "Example 2 Product" column of Table 4. This represents a hydrocarbon product produced from solid corn stover pyrolysis oil processed as described in Table 2.

TABLE 4

| Hydrocarbon class | Min (wt %) | Max (wt %) | Example 2 Product |
|---|---|---|---|
| n-paraffins | 5 | 10 | 8.3 |
| isoparaffins | 15 | 25 | 15.5 |
| olefins | 0.1 | 1 | 0.2 |
| naphthene | 35 | 55 | 52.4 |
| aromatic | 10 | 35 | 23.5 |
| oxygenate | 0.1 | 0.8 | 0.1 |

Figure 4:
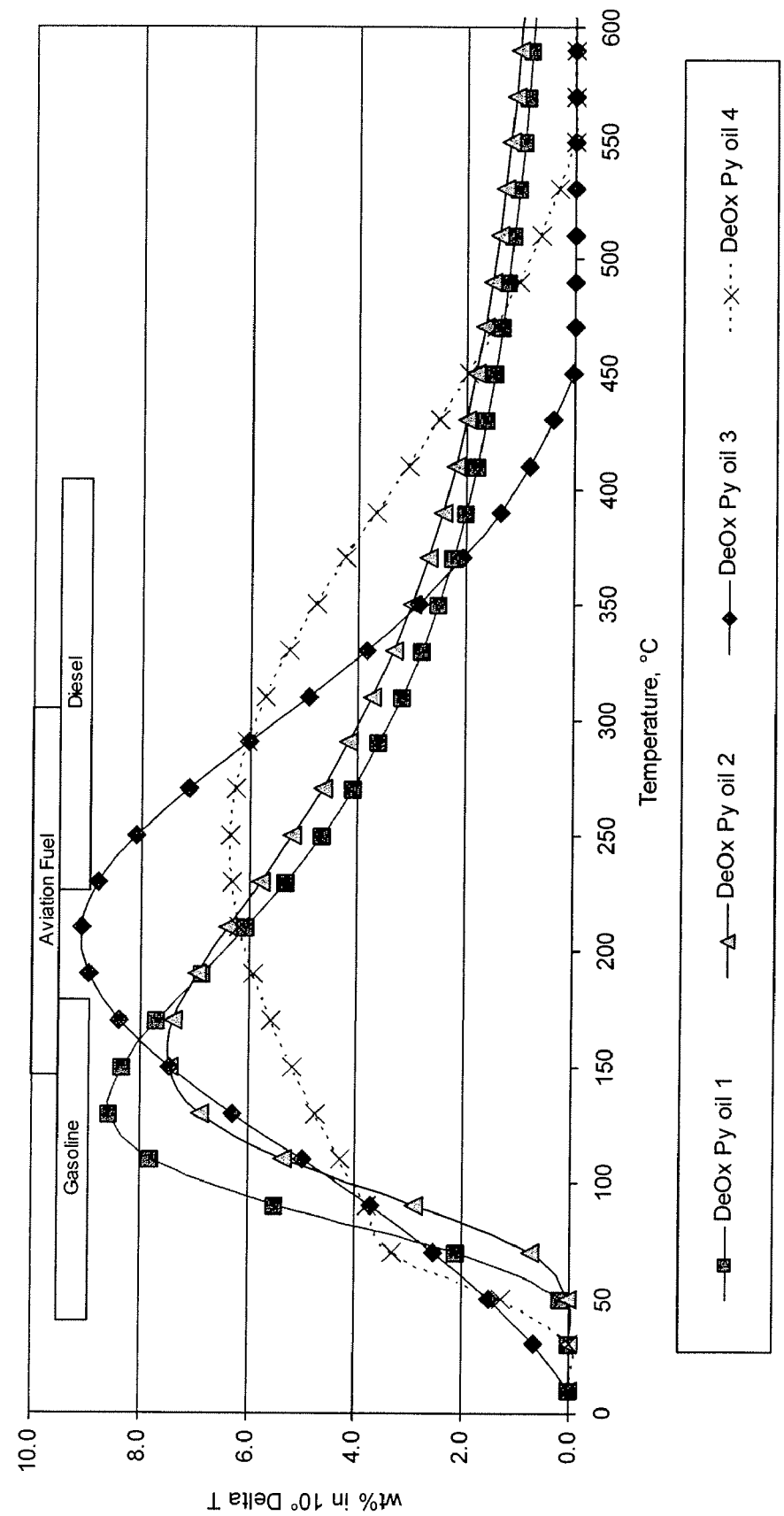
FIG. 4 is a plot of the boiling point distribution of several fully deoxygenated pyrolysis oils which shows the hydrocarbon products produced have a wide boiling point range with significant fractions in the range for each fuel.

The boiling point distribution of several fully deoxygenated pyrolysis oils is shown in FIG. 4. As shown the hydrocarbon product produced has a wide boiling point range with significant fractions in the range for each fuel. Some heavier components are also present that fall outside the range of gasoline, aviation fuel, and diesel. These heavy components could be recycled back into the second zone for further hydrocracking or be isolated for other industrial uses.

The invention claimed is:

1. A process for producing hydrocarbon products from whole pyrolysis oil feedstock comprising:
   (a) partially deoxygenating the whole pyrolysis oil feedstock in a partial deoxygenation zone by contacting the pyrolysis oil with a partial deoxygenation and hydrogenation catalyst in the presence of hydrogen at deoxygenation conditions to produce a partially deoxygenated pyrolysis oil stream comprising water, gasses, light ends, and hydrocarbons;
   (b) passing the partially deoxygenated pyrolysis oil stream to a separation zone to separate a water, gasses, and light ends stream from a remainder stream wherein the light ends of the water, gasses, and light ends stream are processed other than blending with the product stream of step (c); and
   (c) passing the remainder stream to a full deoxygenation zone and deoxygenating the remainder stream by contacting with a deoxygenation catalyst under deoxygenation conditions, to generate a product stream comprising hydrocarbon compounds useful as a fuel or a fuel blending component in the boiling point ranges of gasoline, aviation, diesel, and any combination thereof wherein the product stream comprises from about 1 to about 14 wt % hydrocarbon compounds having a boiling point of about 400° C. to about 600° C.

2. The process of claim 1 further comprising passing the product stream to a second separation zone to separate water, gasses, and light ends from the product stream and generate a purified product stream wherein the light ends of the water, gasses, and light ends stream are processed other than blending with the product stream of claim 1 step (c), and passing the purified product stream to a product fractionation zone to separate the hydrocarbon compounds in the boiling point range of gasoline and the hydrocarbons in the boiling point range of diesel fuel.

3. The process of claim 2 further comprising separating, in the product fractionation zone, the hydrocarbons in the boiling point range of aviation fuel.

4. The process of claim 3 further comprising recycling a portion of the hydrocarbon compounds in the boiling point range of gasoline, the hydrocarbon compounds in the boiling point range of aviation fuel, the hydrocarbons in the boiling point range of diesel fuel, or any combination thereof, to the partial deoxygenation zone, the full deoxygenation zone, or both wherein the volume ratio of recycle to feed to the deoxygenation zone is in the range of about 2:1 to about 8:1.

5. The process of claim 2 further comprising passing the water, gasses, and light ends stream from the second separation zone to a reforming zone to generate a hydrogen stream, and passing the hydrogen stream to the partial deoxygenation zone, the full deoxygenation zone, or both.

6. The process of claim 2 further comprising passing the water, gasses, and light ends stream from the separation zone and the passing the water, gasses, and light ends stream from the second separation zone to a reforming zone to generate a hydrogen stream, and passing the hydrogen stream to the partial deoxygenation zone, the full deoxygenation zone, or both.

7. The process of claim 1 further comprising recycling a portion of the product stream to the partial deoxygenation zone, the full deoxygenation zone, or both wherein the volume ratio of recycle to feed to the deoxygenation zone is in the range of about 2:1 to about 8:1.

8. The process of claim 1 wherein the catalyst in the full deoxygenation zone is more active than the catalyst in the partial deoxygenation zone, the deoxygenation conditions in the full deoxygenation zone are more severe than those of the partial deoxygenation zone, or both.

9. The process of claim 1 further comprising passing the water, gasses, and light ends stream from the separation zone to a reforming zone to generate a hydrogen stream.

10. The process of claim 9 further comprising passing the hydrogen stream to the partial deoxygenation zone, the full deoxygenation zone, or both.

11. The process of claim 1 wherein the partial deoxygenation zone is operated at a pressure in the range from 3.4 MPa (500 psia) to about 20.6 MPa (3000 psia) and a temperature in the range of about 200° C. to about 400° C.

12. The process of claim 1 wherein the full deoxygenation zone is operated at a pressure between about 689 kPa (100 psia) to about 13.8 MPa (2000 psia) and at a temperature of about 300° C. to about 500° C.

13. The process of claim 1 wherein the deoxygenation and hydrogenation catalyst of the partial deoxygenation zone is a hydrotreating catalyst.

14. The process of claim 1 wherein the deoxygenation catalyst of the full deoxygenation zone is a hydrocracking catalyst.

15. A process for producing hydrocarbon products from pyrolysis oil feedstock comprising:
   (a) deoxygenating the pyrolysis oil feedstock in a deoxygenation zone by contacting, in the presence of hydrogen at deoxygenation conditions, the pyrolysis oil with a partial deoxygenation and hydrogenation catalyst in a first portion of the deoxygenation zone with a full deoxygenation catalyst in a second portion of the deoxygenation zone to produce a deoxygenated pyrolysis oil stream comprising water, gasses, light ends, and hydrocarbons;
   (b) passing the deoxygenated pyrolysis oil stream to a separation zone to separate a water, gasses, and light ends stream from a remainder stream wherein the light ends of the water, gasses, and light ends stream are processed other than blending with the product stream of step (c) wherein the remainder stream comprises from about 1 to about 14 wt % hydrocarbon compounds having a boiling point of about 400° C. to about 600° C.; and
   (c) passing the remainder stream to a fractionation zone to separate the hydrocarbon compounds in the boiling point range of gasoline into a gasoline range stream, the hydrocarbon compounds in the boiling point range of aviation fuel into an aviation range stream and the hydrocarbons in the boiling point range of diesel fuel into a diesel range stream.

16. A process for producing hydrocarbon products from pyrolysis oil feedstock comprising:
   (a) deoxygenating the pyrolysis oil feedstock in a deoxygenation zone by contacting, in the presence of hydrogen at deoxygenation conditions, the pyrolysis oil with a mixture of a partial deoxygenation catalyst and a full deoxygenation catalyst to produce a deoxygenated pyrolysis oil stream comprising water, gasses, light ends, and hydrocarbons wherein the partial deoxygenation catalyst is a hydrotreating catalyst and the full deoxygenation catalyst is a hydrocracking;
   (b) passing the deoxygenated pyrolysis oil stream to a separation zone to separate a water, gasses, and light ends stream from a remainder stream wherein the light ends of the water, gasses, and light ends stream are processed other than blending with the product stream of step (c) wherein the remainder stream comprises from about 1 to about 14 wt % hydrocarbon compounds having a boiling point of about 400° C. to about 600° C.; and
   (c) passing the remainder stream to a fractionation zone to separate the hydrocarbon compounds in the boiling point range of gasoline into a gasoline range stream, the hydrocarbon compounds in the boiling point range of aviation fuel into an aviation range stream and the hydrocarbons in the boiling point range of diesel fuel into a diesel range stream.

* * * * *